(12) United States Patent
Amundson

(10) Patent No.: US 6,189,440 B1
(45) Date of Patent: Feb. 20, 2001

(54) CONTINUOUS FLOW PASTEURIZER

(76) Inventor: Daniel Scott Amundson, Rte. 4, Box 288 B, Winona, MN (US) 55987

( * ) Notice: Under 35 U.S.C. 154(b), the term of this patent shall be extended for 0 days.

(21) Appl. No.: 09/531,799

(22) Filed: Mar. 21, 2000

(51) Int. Cl.⁷ .............................. A23C 3/02; A23C 3/04; A23C 9/00
(52) U.S. Cl. ................. 99/455; 99/452; 99/453; 99/470; 99/483
(58) Field of Search ............... 99/452–455, 451, 99/467, 470, 483, 287, 645; 122/4 R; 126/349; 141/364; 134/60.85, 90, 105; 165/135, 109.1, 70, 72, 145, 162, 163; 222/132, 136, 166, 146.5, 249, 389; 219/437, 439, 441; 392/444–447, 451, 455, 448, 460; 422/303; 426/247, 522

(56) References Cited

U.S. PATENT DOCUMENTS

| | | | |
|---|---|---|---|
| 612,106 | * 10/1898 | Hill | 99/453 X |
| 1,975,416 | 10/1934 | Souza . | |
| 2,201,634 | 5/1940 | Shurts . | |
| 2,256,904 | * 9/1941 | Kinter | 165/70 X |
| 2,353,382 | * 7/1944 | Barrett | 99/455 |
| 2,607,566 | 8/1952 | Saunders . | |
| 2,650,980 | 9/1953 | Popow . | |
| 2,822,277 | * 2/1958 | Ellertson et al. | 426/522 X |
| 2,838,288 | 6/1958 | Stoelting et al. . | |
| 3,268,342 | * 8/1966 | Yatuni | 426/522 X |
| 3,289,569 | * 12/1966 | Frolich | 99/455 |
| 3,433,147 | * 3/1969 | Pedersen | 99/455 |
| 3,593,888 | 7/1971 | Brown . | |
| 3,731,494 | * 5/1973 | Fleck | 99/455 |
| 4,321,860 | * 3/1982 | Stolt | 165/135 X |
| 4,441,406 | * 4/1984 | Becker | 99/483 X |
| 4,446,778 | * 5/1984 | Cipelletti | 99/455 |
| 4,479,423 | 10/1984 | Schwitters et al. . | |
| 4,964,333 | * 10/1990 | Bravo | 99/455 |
| 5,555,796 | * 9/1996 | Kortschot et al. | 99/455 X |

* cited by examiner

Primary Examiner—Timothy F. Simone
(74) Attorney, Agent, or Firm—Moore & Hansen

(57) ABSTRACT

A self-contained, continuous flow pasteurizer is herein disclosed. Such a pasteurizer comprises a first tank and a second tank interconnected by a pasteurization conduit. A single pump pumps fluids from the first tank to the second tank at a predetermined flow rate. Fluids are heated to their desired pasteurization temperature in a first section of the conduit and are held at this temperature while flowing through a second section of the conduit. Fluids not reaching the desired pasteurization temperature do not pass into the second section of the conduit but are recirculated back to the first tank by a recirculation valve and conduit connected between the first tank and the pasteurization conduit. A third section of the conduit passes through a cooling structure so that the fluid flowing in the conduit will be cooled down from its pasteurization temperature before being deposited in the second tank.

16 Claims, 5 Drawing Sheets

CONTINUOUS FLOW PASTEURIZER

BACKGROUND OF THE INVENTION

Dairy farmers feed calves colostrum, transitional milk, milk and/or formula for the first six to twelve weeks of a calf's life. Throughout this article, "milk" will refer to all milk except formula. Cow's milk has economic value and therefore, farmers that feed milk typically use milk that does not meet the quality requirement for human consumption. This milk is referred to as "non-saleable" or waste milk. Waste milk does not meet the quality standards because it comes from a cow that either has a disease or is being treated with antibiotics to rid the cow of a disease. On average, 2% of a dairy herd carries a disease that make the milk produced by the diseased cows non-saleable. Pasteurization is one method of improving the quality of waste milk by reducing the potential for disease transmission to the calf.

Formula is used as a food source for calves because it is free from disease, easy to prepare and costs less to feed than saleable milk. Unfortunately, it is still expensive and does not provide the same level of nutrition as cow's milk.

A pregnant cow will not give milk for the last 45–60 days of pregnancy. The first milk produced by the cow after giving birth is colostrum. Colostrum contains antibodies and other important nutritional components critical for the newborn calf. The next couple of milkings after colostrum are referred to as transitional milk. Transitional milk has fewer antibodies and less fat than colostrum.

University research indicates that if colostrum is pasteurized before it is fed to the calf, the calf will weigh more and therefore, is worth more when it goes to market. The antibodies and proteins in colostrum and transitional milk are very sensitive to heat. Colostrum can be pasteurized but the temperature and heating duration must be controlled to limit the damage to proteins and antibodies. The temperature and time that has been demonstrated to be most effective is 161° F. for 15 seconds.

This temperature and time relationship is common in the pasteurizing industry and is referred to as High Temperature Short Time (HTST) pasteurization. Nearly all pasteurized milk consumed by humans today is pasteurized using HTST.

Onsite pasteurization has not been economically feasible up to now because of the complexity and therefore, cost of pasteurizing systems. Pasteurizing systems that were originally designed for pasteurizing products other than cow's milk are being sold to dairy farmers as pasteurizers for milk destined for calves. These pasteurizers are very expensive and have not been designed with the dairy farmer in mind.

Dairy farmers are very busy. A pasteurizer built for today's dairy farmer needs to perform quickly, be easy-to-use, cost effective and require low maintenance. Other systems use water heat or large metal plates for heat exchange. These systems heat up slowly, and therefore, increase the amount of time required to process a batch of milk. Other systems also require multiple operator steps and depend on additional accessories, like tanks, for effective operation.

Consequently, an affordable, convenient way to pasteurize the milk that dairy farmers feed their calves is needed. Such a pasteurizer can give the dairy farmer a means for significant economic benefit through decreased dependence on formula and increased calf health and market value.

SUMMARY OF THE INVENTION

The pasteurizer of the present invention is self-contained and pasteurizes fluids such as milk in a continuous manner. The pasteurizer may be a stationary unit but is preferably mounted upon a mobile cart or the like. In its simplest form, this pasteurizer comprises a first, raw milk tank and a second, pasteurized milk tank. These tanks are fluidically connected by a pasteurization conduit that has a first section where the milk is heated to its pasteurization temperature, a second section which holds the temperature of the milk substantially at its pasteurization temperature for a specified length of time and a third section that acts to cool the milk down to a more useable temperature. A single pump is connected inline with the pasteurization conduit immediately adjacent the raw milk tank and pumps fluids from the first tank to the second tank through the pasteurization conduit at a substantially constant flow rate.

At least one heating element for heating the fluids flowing through the heating section is arranged substantially parallel to the heating section of the pasteurization conduit. The heating elements are preferably retained in a heat transfer structure that has a first channel constructed and arranged to receive therein the heating section of the pasteurization conduit and a second channel that is constructed and arranged to receive therein the heating element. The heat conducting structure positively locates the heating element with regard to the heating section of the pasteurization conduit and acts to thermodynamically couple the heating element to the heating section of the pasteurization conduit.

The temperature hold section of the pasteurization conduit is situated such that the fluids flowing therethrough are subject to substantially no heating or cooling. In order to ensure that the fluids flowing through the temperature hold section are held at their pasteurization for the required length of time, the length of the temperature hold section is based on the flow rate of the fluids flowing therethrough.

In order to conserve space, the heating and temperature hold sections of the pasteurization conduit are preferably arranged circumjacent to the raw milk tank.

The cooling section of the pasteurization conduit is passed through a cooling mechanism such that the fluid flowing therethrough is cooled below its predetermined temperature before being deposited in the second tank. One suitable cooling mechanism is a water bath that is maintained at a relatively lower temperature than the predetermined temperature of the fluids flowing from the temperature hold section to the cooling section.

In order to ensure that the fluids being pumped through the pasteurization conduit reach the desired pasteurization temperature, a diversion valve is connected in line with the pasteurization conduit between the heating section and the temperature hold section. The diversion valve has a first position in which fluids flowing through the heating section pass through the diversion valve and into the temperature hold section. The diversion valve also has a second position in which fluids flowing through the heating section pass through the diversion valve and into a recirculating conduit that directs the fluids back into the first tank. A control means for actuates the diversion valve between its first and second positions based on the temperature of the fluids exiting the heating section of the pasteurization conduit. When the fluids are below the desired temperature, the control means actuates the diversion valve to recirculate the fluids back into the first tank. Fluids that have reached the desired pasteurization temperature are allowed to pass from the heating section, through the diversion valve, and into the temperature hold section of the pasteurization conduit.

In the preferred embodiment of the present invention, the heating section of the pasteurization conduit brings the fluid flowing therethrough to the pasteurization temperature of substantially 161° F. and the temperature hold section of the pasteurization conduit maintains the fluid at its pasteurization temperature of substantially 161° F. for substantially 15 seconds.

DETAILED DESCRIPTION

Figure 1:
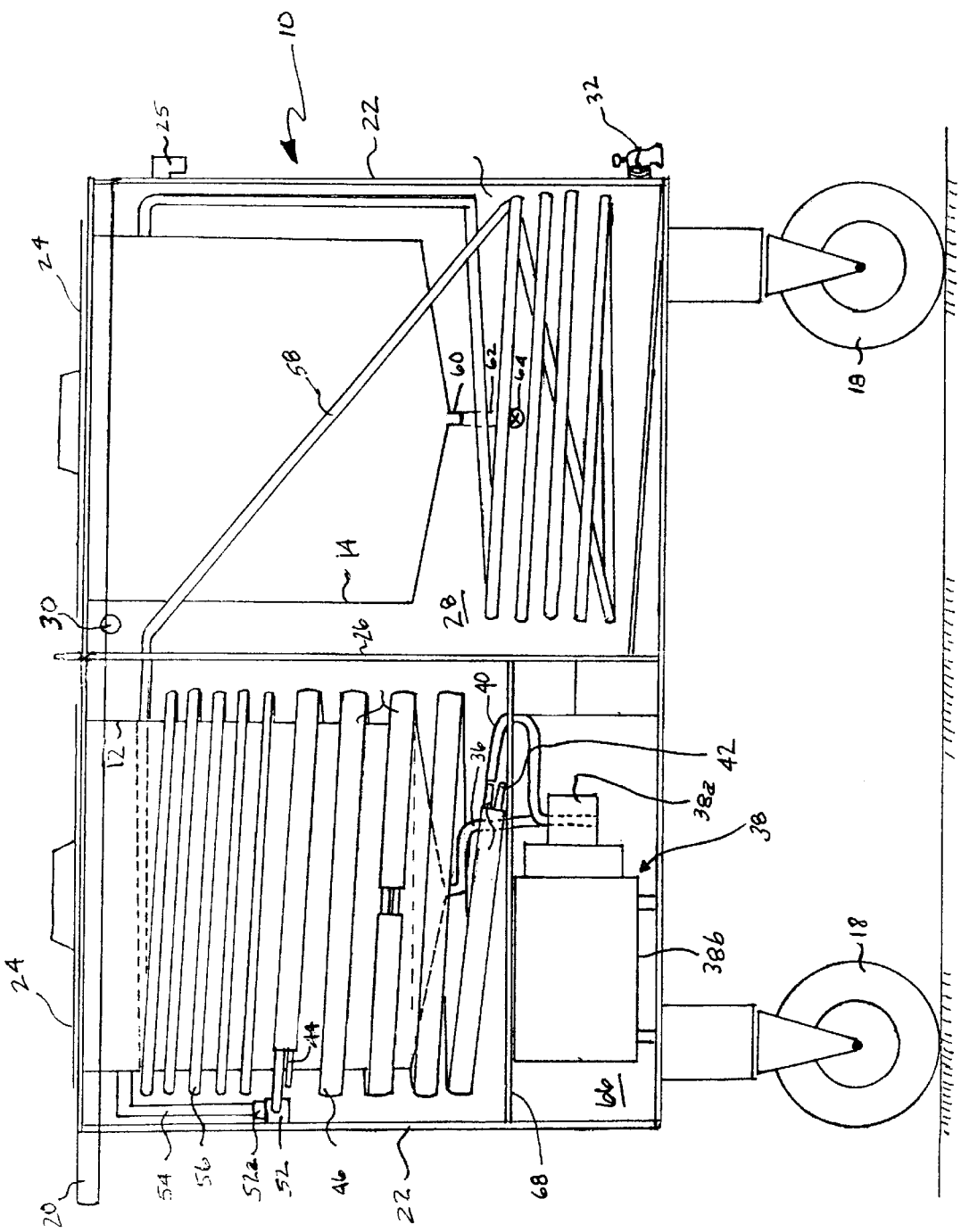
FIG. 1 is a partially cut-away side view of a continuous flow pasteurizer.
Figure 2:
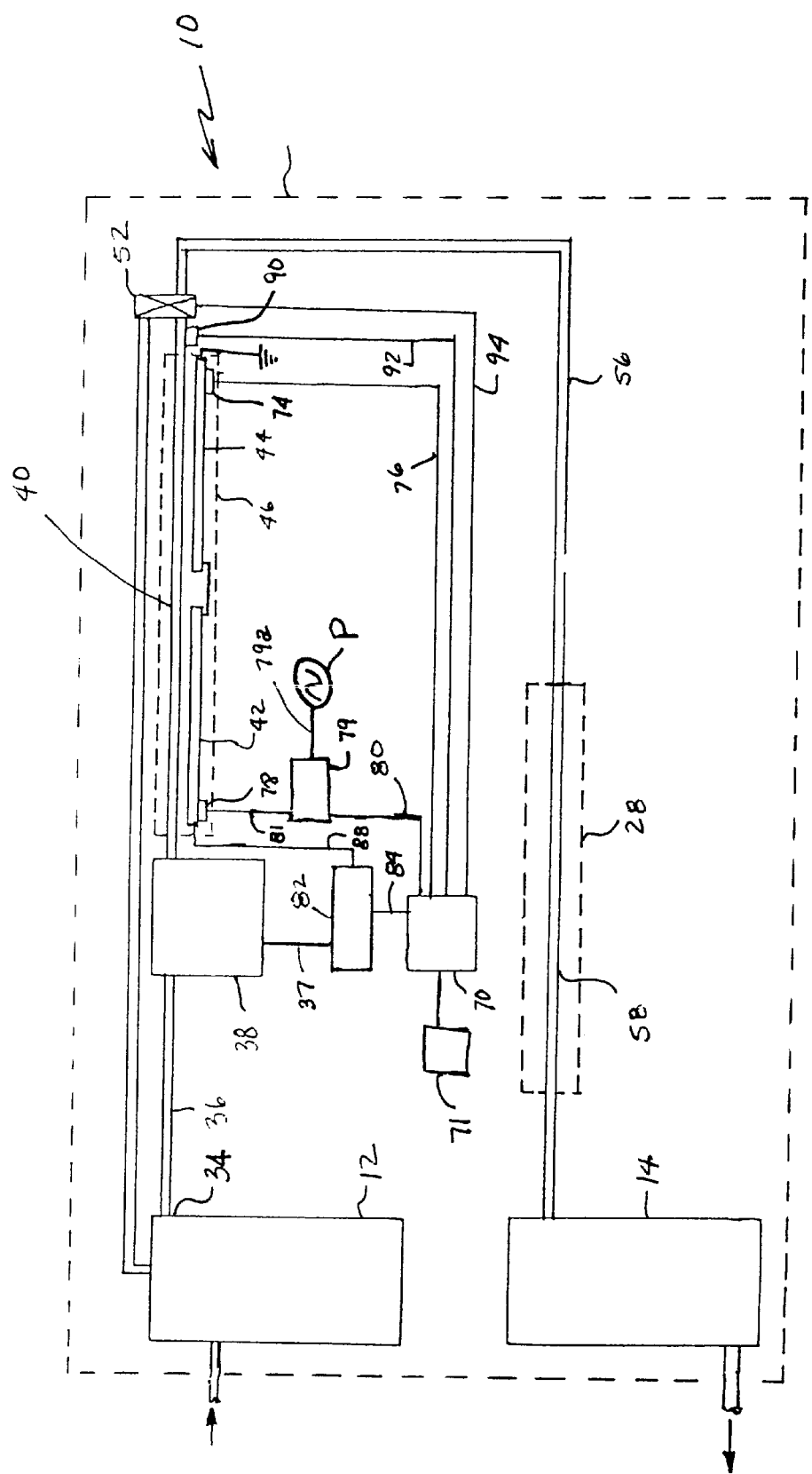
FIG. 2 is a schematic of the continuous flow pasteurizer of FIG. 1.

The advantages of the present invention will appear more fully from the following description made in conjunction with the accompanying drawings wherein like reference characters refer to the same or similar parts throughout the several views. And, although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

One embodiment of the pasteurizing device 10 of the present invention is illustrated in FIG. 1. The pasteurizing device essentially comprises a pair of tanks 12, 14, one for raw milk and the other for pasteurized milk, respectively. Milk is pumped from the raw milk tank 12 to the pasteurized milk tank 14 through a pasteurization conduit 13 having associated therewith heating elements that raise the milk to a predetermined pasteurization temperature as the milk flows from the raw milk tank 12 to the pasteurized milk tank 14.

The embodiment illustrated in FIG. 1 is preferably a self-contained mobile unit that will fit through the average doorway and which is low enough to the ground so the average sized person can pour a 5-gallon bucket of raw milk into the raw milk tank 12 without climbing on a ladder. Furthermore, the pasteurizing device 10 is preferably high enough off the ground so that a 5-gallon bucket, a common vessel for carrying fluids on dairy farms, can be placed under the pasteurized milk tank 14 so that pasteurized milk can be gravity fed into the bucket.

Figure 3:
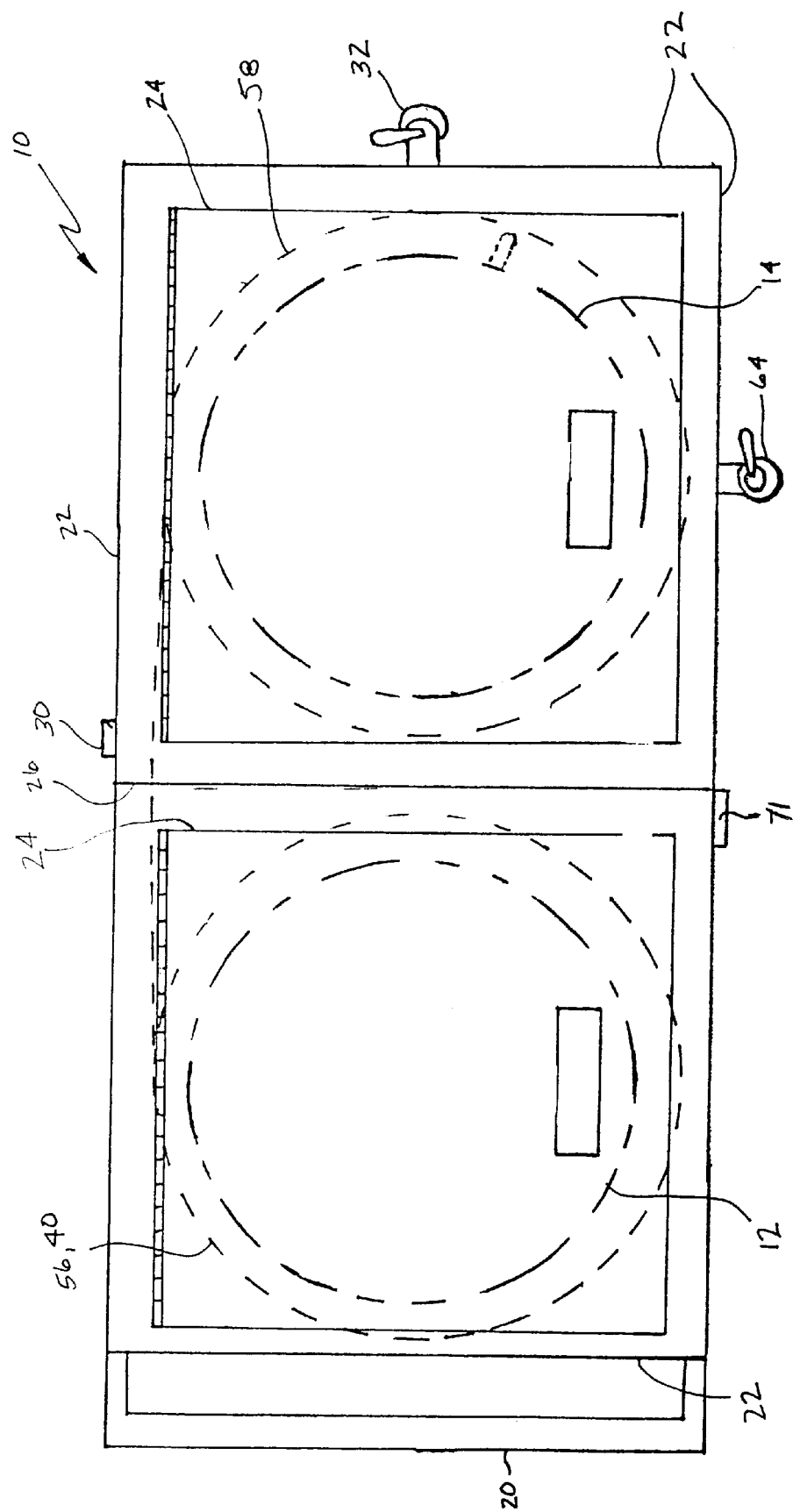
FIG. 3 is a top view of the continuous flow pasteurizer of FIG. 1.

The cart 16 has large rubber tires 18 and a handle 20 that allows the cart 16 to be easily moved from place to place. The cart is preferably enclosed as by panels 22. As can be seen in FIGS. 1 and 3, the milk tanks 12, 14 have an opening at the top of the cart 16. These openings are provided with lids 24 which substantially seal the open upper ends of the milk tanks 12, 14. The lids 24 may be removable but are in this embodiment hinged directly to the cart 16. For reasons of durability and ease of cleaning, the milk tanks 12, 14, the cart, and the tubing connecting the milk tanks, 12, 14 are preferably fabricated from a material that is easily sterilized and resistant to corrosion, such as a food grade stainless steel.

The interior of the cart 16 is provided with a partition 26, which divides the interior of the cart into two compartments, one holding the raw milk tank 12 and the other holding the pasteurized milk tank 14. The compartment holding the pasteurized milk tank 14 is sealed to create a watertight compartment 28. The watertight compartment 28 has an inlet 30 which may be provided with a female hose fitting introducing water into the compartment 28 and two outlets 25 and 32. Outlet 25 is an overflow outlet located below the height of the inlet and outlet 32 is for draining water from the compartment 28 and is preferably a simple water spigot. The bottom of compartment 28 is preferably angled toward the outlet 32 to ensure that the water in the compartment will completely drain therefrom. The watertight compartment 28 is typically filled with water to cool milk flowing from the raw milk tank 12 into the pasteurized milk tank 14.

Figure 5:
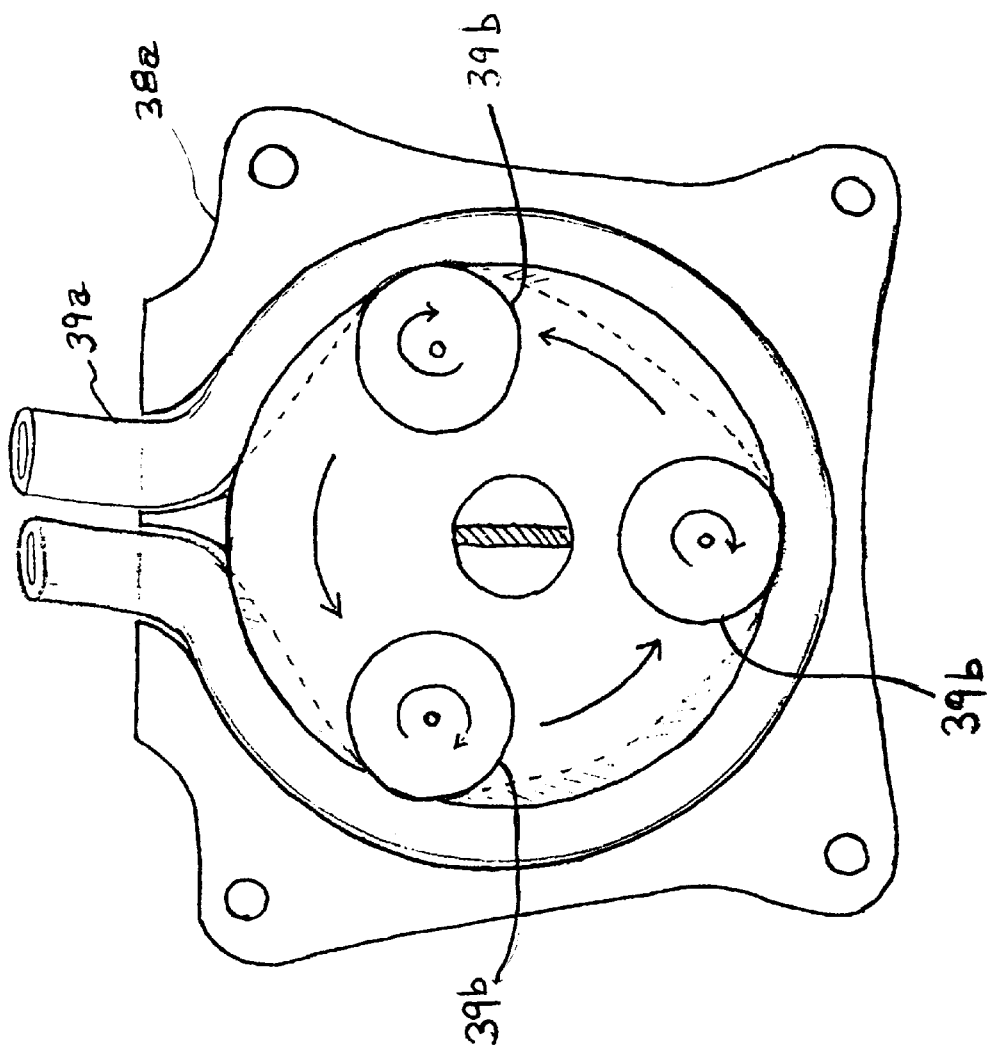
FIG. 5 is a side view of a peristaltic pump head.

Raw milk in the raw milk tank 12 passes from the raw milk tank 12 through an outlet 34 to which is connected tubing 36. A removable fine meshed screen lies near the top of the raw milk tank 12 and prevents debris that might be in the milk from entering the pasteurization conduit 13 and clogging the system. Tubing 36 is in turn connected to a pump 38 having a pump head 38a that is driven by a motor 38b. Pump 38 is preferably a peristaltic pump though other types of pumps may be used. A stationary flexible tube 39a that passes through the peristaltic head 38a (FIG. 5) of pump 38 receives milk from tubing 36. The motor 38b turns rollers 39b that pass along the outer surface of the tube 39a, thereby squeezing the tube 39a down its length and consequently moving the milk through the tube 39a. Because the peristaltic pump comprises a tube 39a, the pump components and the milk are kept separate from one another. This makes the system easy to clean and eliminates the chance of contaminants collecting in cracks, crevices or low points like those found in other pump head designs. The peristaltic pump 38 also provides a steady and predictable flow of fluid through the pasteurization conduit 13. Exact flow is critical for continuous-flow pasteurization as this type of process depends on an exact time, temperature and flow rate relationship.

Figure 4:
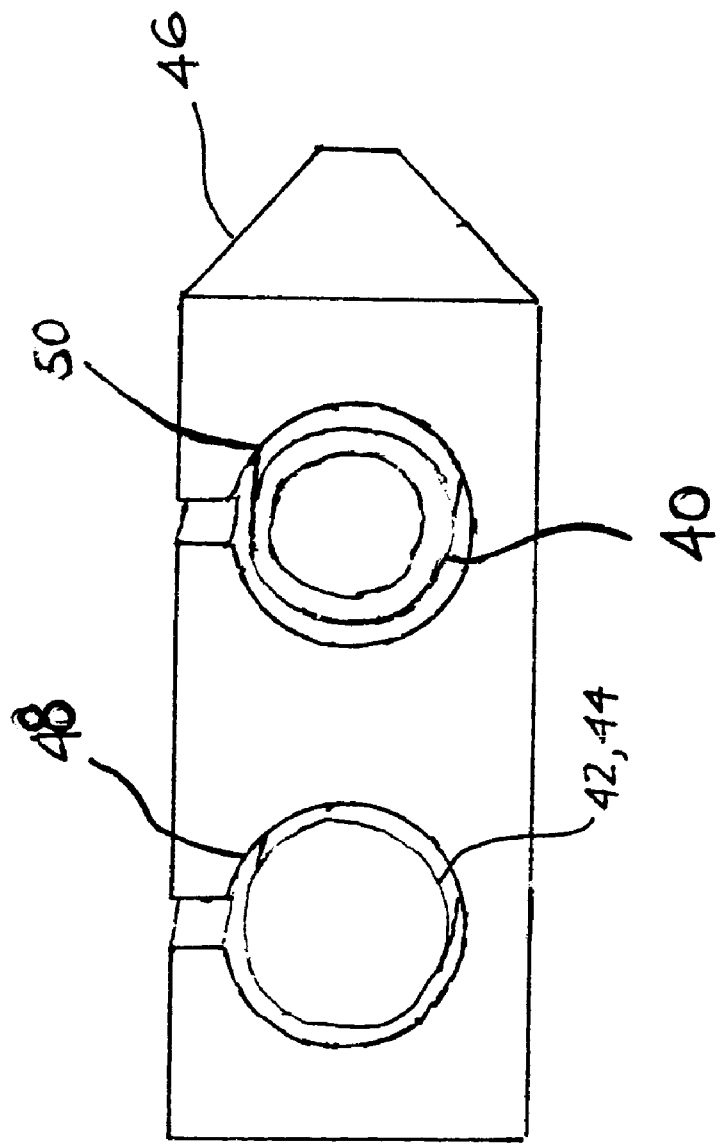
FIG. 4 is a perspective view of the end of a heat transfer structure.

Raw milk is conveyed from the pump 38 through a series of stainless steel tubes that comprise the pasteurization conduit 13. The pasteurization conduit 13 can be divided into three sections: a heating section 40, a temperature hold section 56 and a cooling section 58. The heating section 40 of the pasteurization conduit 13 is connected at one end to the outlet of pump 38. Milk passes into the heating section 40 and is heated by a pair of electric heating elements 42, 44 that are arranged in series along the length of heating section 40. Though a pair of heating elements 42, 44 are disclosed, it is to be understood that one or more heating elements may also be used to heat the milk without exceeding the broad scope of this disclosure. Each of the heating elements 42, 44 are maintained in a close and substantially parallel relation to the heating section 40 by respective elongate heat transfer structures 46. Each elongate heat transfer structure 46 is substantially the same length as the heating element 42 or 44 with which it is associated. It is also contemplated that a single heat transfer structure 46 may also be used. As can be seen in FIG. 4, the elongate heat transfer structures 46 comprise a first channel 48 and a second channel 50. Channel 48 is constructed and arranged to receive therein either of the heating elements 42 or 44. Channel 50 is similarly constructed and arranged to receive therein the tubing of heating section 40. As can be appreciated from viewing FIGS. 1 and 4, the heating elements 42 and 44 are maintained in a uniform spatial relationship to the heating section 40 at all times. In addition, the thermal mass of the heat transfer structure 46, which is preferably made of metal such as aluminum or copper, thermodynamically couples the heating elements 42, 44 to the heating section 40 to promote the even transfer of heat from the heating elements 42, 44 to the raw milk flowing through the heating section 40. The thermal mass of each heat transfer structure 46 is carefully gauged to allow rapid, even and economical heating of the milk flowing through the heating section 40. As raw milk from the raw milk tank 12 passes through heating section 40, it is heated to a predetermined pasteurization temperature, preferably to 161° Fahrenheit as indicated above.

As can be seen in FIG. 1, heating section 40, and hence the heating elements 42, 44 and heat transfer structure 46 are arranged circumjacent to the raw milk tank 12. This arrangement minimizes the amount of space required for heating section 40 of the pasteurization conduit 13. Alternatively, the heating section 40 may be arranged in one or more helical coils located intermediate the tanks 12 and 14.

The outlet of the heating section 40 is connected to the inlet of a recirculation or diversion valve 52. The diversion valve 52 has a first outlet to which the inlet of a recirculation conduit 54 is connected. The outlet of the recirculation conduit 54 is in turn connected to the raw milk tank 12 to allow milk that has not reached the predetermined pasteurization temperature to pass from the heating section 40, through the recirculation conduit 54, and back to the raw milk tank 12. Milk that has reached the predetermined pasteurization temperature passes from the heating section 40, through the diversion valve 52 and into the temperature hold section 56 of the pasteurization conduit 13. The temperature hold section 56 is, like heating section 40, arranged circumjacent to the raw milk tank 12, but may also be arranged in one or more helical coils disposed intermediate the tanks 12, 14. The outlet of the temperature hold section 56 is connected through the barrier 26 to the cooling section 58 of the pasteurization conduit 13. The temperature hold section 56 is of a length sufficient to allow the heated milk to flow for a predetermined length of time (preferably 15 seconds) without any further heating or cooling.

Raw milk that is placed in the raw milk tank 12 may be at a wide range of temperatures. It is preferable that the heating elements 42, 44 be sufficiently powerful that the milk passing through heating section 40 will, on its first transit through the heating section 40, be immediately brought to the predetermined pasteurization temperature. But where the milk in the raw milk tank 12 is sufficiently cold, the heating elements 42, 44 may not be able to heat the milk to the desired temperature on its first transit through the heating section 40. In this case, the too-cool and as of yet unpasteurized milk will be diverted back into the raw milk tank 12 through the diversion valve 52 and recirculation conduit 54.

The length of the temperature hold section 56 is a function of the length of time that the raw milk must stay at the predetermined pasteurization temperature and of the flow rate of the milk through the pasteurization conduits 13. Given that the flow rate of the milk through the heating section 40 and pasteurizing conduit 56 may be accurately and precisely controlled and is therefore known, use of a predetermined length of tubing of a predetermined diameter for the temperature hold section 56 results in a predetermined transit time for the milk through the temperature hold section 56. The length and diameter of tubing required for the temperature hold section 56 will be varied with respect to the flow rate of the milk being passed therethrough in order to hold the milk at a given temperature for the desired amount of time.

When the now-pasteurized milk enters the cooling section 58 it immediately begins to cool. The cooling section 58 of the pasteurization conduit 13 is preferably disposed within a water bath in compartment 28 that hastens the cooling of the milk flowing through the cooling section 58. In order to minimize the size of the pasteurizing device 10, at least some portion of the cooling section 58 is preferably also arranged circumjacent to the pasteurized milk tank 14. What is more, the quantity of water or the extent of the cooling section 58 disposed within the water bath in compartment 28 can be adjusted as needed to cool the pasteurized milk from its pasteurization temperature to below a predetermined maximum temperature before the milk flows into the pasteurized milk tank 14. In order to increase the cooling rate of the pasteurized milk, a continuous supply of water may be introduced into the inlet 30 of the sealed compartment 28. In this instance, care must be taken to insure that the flow of water from the sealed compartment 28 is greater or equal to the flow of water into the sealed compartment 28. As the pasteurized milk tank 14 is also disposed within the water bath in compartment 28, the milk in the tank 14 will continue to cool after it has been deposited in the tank 14.

Milk is removed from the pasteurized milk tank 14 by means of a tube 62 that is connected between an outlet 60 of the pasteurized milk tank 14 and a spigot 64. As described above, the spigot 64 is preferably supported high enough above the surface upon which the cart 16 is resting that a container of useful size, e.g. a five gallon bucket (not shown), may be placed under the spigot 64 to catch the pasteurized milk as it exits the pasteurized milk tank 14. Alternatively, a tube or hose (not shown) can be connected to the spigot 64 for directing the pasteurized milk to its final destination.

As can be seen in FIG. 1, it is preferable to mount the pump 38 in a separate compartment 66 located immediately below the raw milk tank 12. This compartment 66 is separated from the raw milk tank 12 by an insulated bulkhead 68. The insulated bulkhead 68 protects the pump 38 and the process controller 70 that operates the pasteurizing device 10 from the heat generated by the heating elements 42, 44 and also prevents the pump 38 and process controller 70 from being exposed to moisture that might possible damage these components. The interior of the compartment 66 is accessed through a port in the panel 22 that is typically covered by a removable panel (not shown).

The process controller 70 is preferably an integrated circuit device comprising a microprocessor and the input/output devices necessary to communicate with the various elements of the control system of the pasteurizing device 10. However, it is to be understood that the process controller 70 may also be an equivalent non-integrated circuit that may or many not include a microprocessor or even an equivalent set of analog controls. A user of the pasteurization device may start, stop, and control the pasteurization process by appropriately manipulating the user controls 71. The user controls 71 are connected to the process controller 70 and may be any combination of push buttons, toggles, switches, or electronic input devices.

The process controller 70 is electrically connected to one or more relays 82 by one or more conductors 84. Relay 82 is responsible for switching power to the heating elements 42, 44 and pump 38. When the pasteurizer 10 is activated, the heating element begins to heat to a predetermined set point temperature. When this temperature is reached the process controller 70 sends an electrical signal to relay 82 causing the relay to supply operative power to the pump 38. Relay 82 is connected to the heating elements 42, 44 by electrical conductor 88 and to the pump 38 by electrical conductor 37.

In addition to controlling the relay 82, the process controller 70 also regulates the power being supplied to the pump 38 and heating elements 42, 44. By regulating the power being supplied to the pump 38 and heating elements 42, 44, the process controller 70 can delay the start of the pump 38 and control the temperature and operation of the heating elements 42, 44.

A thermocouple 74 is secured to the heat transfer structure 46 near the end of the heating element that is adjacent to the diversion valve 52. The thermocouple 74 is electrically connected to the process controller 70 by connector 76. The temperature data provided by thermocouple 74 is used by the process controller 70 to control heating elements 42, 44, thereby ensuring that the temperature of the heat transfer structure 46 does not exceed a predetermined high limit temperature. Where pasteurization is to take place at 161° Fahrenheit, it is preferred to set the high limit temperature at approximately 162° Fahrenheit, though it is to be understood that both the pasteurization temperature and high limit temperature may be varied as the needs of the situation demand. When this high limit temperature is exceeded, power to the heating elements 42, 44 is cut off or reduced until such time as the temperature drops below a predetermined low limit temperature, at which time the power to the heating elements 42, 44 is restored or increased. Note that because thermocouple 74 is attached to the heat transfer structure 46, the temperature readings given by the thermocouple 74 do not necessarily reflect the actual temperature of the heating element 42.

A thermostat 78 is affixed to the heat transfer structure 46 adjacent the end of the second heating element 44 nearest the pump 38 and is electrically connected to a relay 79 by connector 81. Relay 79 is in turn connected to the process controller 70 by connector 80. Power for operating the pasteurizing device 10 is provided by power source P that is connected to relay 79 by connector 79a. Thermostat 78 determines when a pasteurization cycle has ended and signals relay 79 to cut power to the pasteurizing device 10 when a cycle has ended. In operation, once all of the milk from tank 12 has been pasteurized and pumped into tank 14, pump 38 will begin to move air through the heating section 40. As the air will not absorb as much heat from the heat transfer structure 46 as the milk, the temperature of the heat transfer structure 46 will begin to rise. Once the temperature of the heat transfer structure 46 has risen above the predetermined shut off temperature, generally in the range of 20° Fahrenheit above the high limit temperature described above, thermostat 78 signals relay 79 to cut power to the pasteurizing device 10. Controls 71 are provided with a switch or button that must be manually manipulated to restore power to the system once the heating section 40 has sufficiently cooled.

A second thermocouple 90 is located within the conduit of the heating section 40 between heating element 44 and diverting valve 52. Thermocouple 90 is connected to process controller 70 by electrical connection 92. Temperature signals from thermocouple 90 are used by the process controller 70 to control the switching function of the diversion valve 52, which is preferably actuated by a solenoid. Process controller 70 is connected to the actuation mechanism of the diversion valve 52 by connector 94. Where temperature data from thermocouple 90 indicates that the raw milk has not yet reached the predetermined pasteurization temperature, a signal from process controller 70 actuates the diversion valve 52 to a first position in which the raw milk is diverted back to the raw milk tank 12 through the recirculation conduit 54. When the temperature signals received from the thermocouple 90 indicate that the raw milk flowing through the heating section 40 has reached the predetermined pasteurization temperature, a signal from process controller 70 actuates the diversion valve 52 to a second position in which the raw milk is allowed to pass into the temperature hold section 56.

Cleaning the pasteurization device 10 is accomplished by scrubbing the interior of the raw and pasteurized milk tanks 12, 14, preferably by hand with a suitable detergent or sterilizing agent (e.g. bleach or equivalent) and by passing the detergent or sterilizing agent through the pasteurization conduit 13 connecting the tanks 12, 14. This is easily accomplished by activating the pasteurizing device 10 to run the detergent or sterilizing agent through a pasteurizing cycle, Once the detergent or sterilizing agent has been run through the pasteurization conduit 13 and the pasteurizing device 10 has shut down, another cycle of the pasteurizing device 10 should be completed using clean water to rinse the pasteurization conduit 13 of the pasteurizing device 10. Alternatively, the process controller 70 may be arranged to impose an automatic cleaning and rinsing cycle wherein cleaning fluids and/or rinsing liquids are passed from tank 12, through the pasteurizing conduit 13, to tank 14 and finally out of tank 14 through outlet spigot 64. Such a cleaning cycle can be arranged to run with or without the heating elements 42, 44.

In operation, raw milk is poured into the raw milk tank 12 and controls 71 are manipulated to start the pasteurization cycle. At the outset of the pasteurization cycle, the heating elements 42, 44 are relatively cold and therefore it is preferred to delay the operation of the pump 38 until the heaters 42, 44 have reached their preferred operating range. Once the heating elements 42, 44 have sufficiently warmed, the pump 38 begins to cycle the milk through the pasteurization conduit 13. Preferably, compartment 28 has already been filled with water for cooling the milk flowing through pasteurization conduit 13. However, if so desired, the user would at this time hook up a water hose to the inlet 30 of the compartment 28 to allow a continuous stream of water to flow through the compartment 28. Compartment 28 has been provided with an overflow port to prevent pressure from building up in the compartment during filling.

As described above, the milk being pumped through the heating section 40 of the pasteurization conduit 13 is heated to its predetermined pasteurization temperature on its first transit through the heating section 40. Where this is the case, the temperature of the milk will be noted by thermocouple 74 and process controller 70 will actuate diversion valve 52 to allow the properly heated milk to pass into the temperature hold section 56 of the pasteurization conduit 13. Conversely, if the milk has not yet reached its predetermined pasteurization temperature, the diversion valve 52 is actuated to direct the fluid back to the raw milk tank 12 through the recirculation conduit 54.

As the properly heated milk passes through the temperature hold section 56 of the pasteurization conduit 13, it is neither heated nor cooled, but remains at its predetermined pasteurization temperature for the length of time need to completely pass through the temperature hold section 56. As indicated above, the length of time required for the milk to pass through the temperature hold section 56 is important to the proper pasteurization of the milk.

Once the milk has passed through the temperature hold section 56, it passes through the partition or barrier 26 and into the cooling section 58 of the pasteurization conduit 13. As the cooling section 58 is disposed within the water bath in compartment 28, the milk flowing within the cooling section immediately begins to cool. Cooling section 58 eventually deposits the now-pasteurized milk into the pasteurized milk tank 14 from which it may be collected in a bucket or other container by means of spigot 64.

When all of the milk has been pasteurized, the pump 38 will begin to pump air through the pasteurization conduit 13. As the air in the heating section 40 will not absorb heat as efficiently as the milk that had previously flowed therethrough, the temperature of the heating section 40 will rise quickly. Once the temperature of the heating section 40 has risen above the predetermined shut off temperature, thermostat 78 will signal relay 79 to cut power to the pasteurizing device 10.

While the pasteurizing device 10 of the present invention is primarily used to pasteurize colostrum or waste milk so that a farmer can avoid using more costly formulas in the feeding of calves, it may also be used to heat formula to a temperature that makes it more palatable for the calves. Formula for calves is typically delivered in a powder form and is mixed with tap water. Because the resulting formula is initially too cold to be fed directly to a calf, the formula must first be heated. A suitable formula heating cycle would be substantially identical to the pasteurization cycle described above and would differ only in that the heating elements would operate at a lower temperature.

The foregoing is considered as illustrative of the principles of the invention. Since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A self-contained, continuous flow pasteurizer comprising:
   a first tank and a second tank, each of the tanks having an inlet and an outlet, the tanks being mounted upon a mobile framework that also includes a cooling structure that is disposed around the second tank;
   a pump mechanism having an inlet and an outlet, the inlet of the pump mechanism being fluidically connected to the outlet of the first tank;
   a heating conduit fluidically connected between the outlet of the pump mechanism and an inlet of a recirculating valve, the recirculating valve having a first and a second outlet, the heating conduit being arranged and constructed to heat a fluid passing therethrough to a predetermined pasteurization temperature;
   a temperature hold conduit fluidically connected between the first outlet of the recirculating valve and an inlet of a cooling conduit, the temperature hold conduit being constructed and arranged to maintain a fluid flowing therethrough at the predetermined pasteurization temperature for a predetermined time whereafter the fluid flowing in the temperature hold conduit enters the cooling conduit which passes through at least a portion of the cooling structure, an outlet of the cooling conduit being fluidically connected to the second tank; and,
   a recirculation conduit having an inlet and an outlet, the inlet of the recirculation conduit being fluidically connected to the second outlet of the circulation valve and the outlet of the recirculation conduit being fluidically connected to a recirculation port of the first tank, the recirculation valve also being selectively actuable between a first position in which milk flowing through the heating conduit is diverted by the recirculation valve into the recirculation conduit and hence, back into the first tank, and a second position in which milk flowing through the heating conduit is directed into the temperature hold conduit and ultimately into the second tank.

2. The self contained continuous flow pasteurizer of claim 1 wherein the heating conduit further comprises:
   at least one heating element arranged in a substantially parallel relationship with the heating conduit, the at least one heating elements being arranged and constructed to raise the temperature of a fluid flowing through the heating conduit to a predetermined pasteurization temperature.

3. The self-contained continuous flow pasteurizer of claim 2 wherein the heating conduit further comprises:
   a heat transfer structure having a first channel and a second channel, the first channel being constructed and arranged to receive therein the heating conduit, the second channel being constructed and arranged to receive therein at least one heating element, the heat conducting structure acting to thermodynamically couple the at least one heating element with the heating conduit.

4. The self-contained continuous flow pasteurizer of claim 1 wherein the heating conduit and the temperature hold conduit are arranged circumjacent to the first, raw milk tank.

5. The self contained continuous flow pasteurizer of claim 1 wherein the heating conduit and the temperature hold conduit are arranged in a helical coil located intermediate the first and second tanks.

6. The self-contained continuous flow pasteurizer of claim 1 wherein the pump comprises a peristaltic pump.

7. A self-contained, continuous flow pasteurizer comprising:
   a first tank and a second tank, each of the tanks having an inlet and an outlet, the tanks being mounted upon a mobile framework that also includes a cooling structure that is disposed around the second tank;
   a single pump for pumping fluids from the first tank to the second tank at a predetermined flow rate, the pump having an inlet and outlet, the inlet of the pump being fluidly connected to the outlet of the first tank;
   a heating conduit fluidically connected between the outlet of the pump mechanism and an inlet of a recirculating valve, the recirculating valve having a first and a second outlet, the heating conduit being arranged and constructed to heat a fluid passing therethrough to a predetermined pasteurization temperature;
   a temperature hold conduit fluidically connected between the first outlet of the recirculating valve and the inlet of a cooling conduit, the temperature hold conduit being constructed and arranged to maintain a fluid flowing therethrough at the predetermined pasteurization temperature for a predetermined time whereafter the fluid flowing in the temperature hold conduit enters the cooling conduit which passes through at least a portion of the cooling structure, an outlet of the cooling conduit being fluidically connected to the second tank, the heating conduit and temperature hold conduits being arranged circumjacent to the first tank and the cooling conduit being arranged circumjacent to the second tank; and,
   a recirculation conduit having an inlet and an outlet, the inlet of the recirculation conduit being fluidically connected to the second outlet of the circulation valve and the outlet of the recirculation conduit being fluidically connected to a recirculation port of the first tank, the recirculation valve also being selectively actuable between a first position in which milk flowing through the heating conduit is diverted by the recirculation valve into the recirculation conduit and hence, back into the first tank, and a second position in which milk flowing through the heating conduit is directed into the temperature hold conduit and ultimately into the second tank.

8. The self-contained continuous flow pasteurizer of claim 7 wherein the heating conduit further comprises:

a heat transfer structure having a first channel and a second channel, the first channel being constructed and arranged to receive therein the heating conduit, the second channel being constructed and arranged to receive therein at least one heating element, the heat conducting structure acting to thermodynamically couple the at least one heating element with the heating conduit so as to heat fluids flowing through the heating conduit.

9. The self-contained continuous flow pasteurizer of claim 7 wherein the pump comprises a peristaltic pump.

10. A self-contained, continuous flow pasteurizer comprising:

a first tank and a second tank, the first and second tanks being fluidically connected by a pasteurization conduit having a first, heating section, a second, temperature hold section, and a third, cooling section;

a single pump connected inline with the pasteurization conduit immediately adjacent the first tank, the pump being arranged and constructed to pump fluids from the first tank to the second tank through the pasteurization conduit at a substantially constant flow rate;

a heating element arranged substantially parallel to the heating section of the pasteurization conduit for heating the fluids flowing through the heating section to a predetermined temperature;

the temperature hold section of the pasteurization conduit being situated such that the fluids flowing therethrough are subject to substantially no heating or cooling, the temperature hold section further being of sufficient length in relation to the substantially constant flow rate of the fluids such that the fluids flowing therethrough are maintained substantially at the same temperature for a predetermined period of time; and, the cooling section of the pasteurization conduit passing through a cooling mechanism such that the fluid flowing therethrough is cooled below its predetermined temperature before being deposited in the second tank.

11. The self-contained continuous flow pasteurizer of claim 10 wherein the heating section and temperature hold section of the pasteurization conduit are arranged circumjacent to the first tank.

12. The self-contained, continuous flow pasteurizer of claim 10, further comprising:

a heat transfer structure having a first channel and a second channel, the first channel being constructed and arranged to receive therein the heating section of the pasteurization conduit, the second channel being constructed and arranged to receive therein the heating element, the heat conducting structure acting to thermodynamically couple the heating element with the heating section of the pasteurization conduit.

13. The self-contained, continuous flow pasteurizer of claim 10 wherein the cooling section of the pasteurization conduit is arranged and constructed to pass through a water bath that is maintained a relatively lower temperature than the predetermined temperature of the fluids flowing from the temperature hold section to the cooling section.

14. The self-contained, continuous flow pasteurizer of claim 10 wherein the pasteurizer is mounted upon a mobile cart.

15. The self-contained, continuous flow pasteurizer of claim 10, further comprising:

a diversion valve connected in line with the pasteurization conduit between the heating section and the temperature hold section, the diversion valve having a fist position in which fluids flowing through the heating section pass through the diversion valve and into the temperature hold section, and a second position in which fluids flowing through the heating section pass through the diversion valve and into a recirculating conduit that directs the fluids back into the first tank; and, a control means for actuating the diversion valve between its first and second positions.

16. The self-contained, continuous flow pasteurizer of claim 10 wherein the heating section of the pasteurization conduit brings the fluid flowing therethrough to substantially 161° F. and wherein the temperature hold section of the pasteurization conduit maintains the fluid at substantially 161° F. for substantially 15 seconds.

* * * * *